(12) United States Patent
Music

(10) Patent No.: US 7,376,204 B1
(45) Date of Patent: May 20, 2008

(54) DETECTION OF UNKNOWN SYMBOL RATE IN A DIGITALLY MODULATED SIGNAL

(75) Inventor: Wayne D. Music, Beaverton, OR (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 532 days.

(21) Appl. No.: 11/083,625

(22) Filed: Mar. 16, 2005

(51) Int. Cl.
*H04L 27/00* (2006.01)

(52) U.S. Cl. ...................................... 375/316

(58) Field of Classification Search ................ 375/225, 375/316, 355; 327/113; 342/196; 708/404, 708/405; 379/406.13
See application file for complete search history.

(56) References Cited

U.S. PATENT DOCUMENTS

| | | | | |
|---|---|---|---|---|
| 5,524,120 A | * | 6/1996 | Pride et al. | ........... 375/225 |
| 5,715,277 A | * | 2/1998 | Goodson et al. | ........... 375/222 |
| 2003/0200243 A1 | * | 10/2003 | Yomo et al. | ........... 708/306 |

OTHER PUBLICATIONS

D.E. Reed, et. al. Minimization of Detection of Symbol-Rate Spectral Lines by Delay and Multiply Receivers. IEEE Transactions on Communications, vol. 36, No. 1, Jan. 1988.

William A. Gardner. Signal Interception: A Unifying Theoretical Framework for Feature Detection. IEEE Transactions on Communications, vol. 36, No. 8, Aug. 1988.

Les Atlas, et. al. Resolution Advantages of Quadratic Signal Processing. SPIE vol. 1566. Advanced Signal Processing Algorithms, Architectures, and Implementations (1991).

Thomas T. Fang. I and Q Decomposition of Self-Noise in Square-Law Clock Regenerators. IEEE Transactions on Communications, vol. 36, No. 9, Sep. 1988.

R.J. Mammone, et. al. Estimation of Carrier Frequency, Modulation Type and Bit Rate of an Unknown Modulated Signal. Rutgers University, Dept. of ECE. CH2424-0\87\0000-1006. 1987 IEEE.

Nelson M. Blachman, et. al. The Spectrum of the Square of a Synchronous Random Pulse Train. IEEE Transactions on Communications, vol. 38, No. 1, Jan. 1990.

Yawpo Yang, et. al. An Improved Moment-Based Algorithm for Signal Classification. Signal Processing 43 (1995) 231-244. Elsevier Science B.V. SSDI 0165-1684 (95) 00002-X.

* cited by examiner

*Primary Examiner*—Sam K Ahn

(57) ABSTRACT

In one embodiment of the invention, a symbol rate detector includes a nonlinear device to receive a pass band signal, a component to apply a Fourier Transform to a signal provided by the filter, and logic to select a peak frequency component from results of applying the Fourier Transform and to apply the peak frequency component as a symbol rate of a base band signal corresponding to the pass band signal.

17 Claims, 3 Drawing Sheets

DETECTION OF UNKNOWN SYMBOL RATE IN A DIGITALLY MODULATED SIGNAL

TECHNICAL FIELD

The present disclosure relates to detection of symbol rate in a digitally modulated signal.

BACKGROUND

Symbol rate detection of digitally modulated communication signals is used in many areas including synchronization, surveillance, identification and electronic intelligence gathering. Existing techniques include statistical moments, temporal correlation, spectral correlation, and instantaneous phase detection. These techniques have several drawbacks. The technique of statistical moments is complex and may not have the correct probability density function to model the signal. Temporal and spectral correlation result in output signals that contain periodic components with harmonics at multiples of the symbol rate and the carrier frequency, confusing the detection of the exact symbol rate. Instantaneous phase detection cannot detect exact symbol rate. All four techniques fail to detect the symbol rate for input signals with a small excess bandwidth factor.

SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

In one embodiment of the invention, a symbol rate detector includes a nonlinear device to receive a pass band signal, a component to apply a Fourier Transform to a signal provided by the filter, and logic to select a peak frequency component from results of applying the Fourier Transform and to apply the peak frequency component as a symbol rate of a base band signal corresponding to the pass band signal.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may. It may be noted at various points in this description that one or more field programmable gate arrays (FPGAs) may be employed to perform various aspects of the processing. In general the techniques described herein are not limited to FPGAs, and other types of logic (software and/or circuits to provide control and data manipulation) may be applied to perform all or aspects of the processing described herein. Herein, "logic" refers to any configuration of circuits and/or memory that may be applied to affect operations within a device. Logic may comprise signals stored in a machine memory and applied to a processing device, such as a microprocessor, digital signal processor, microcontroller, and so on. Software is one example of such logic. Examples of machine memories that may comprise logic include RAM (random access memory), flash memories, ROMS (read-only memories), EPROMS (erasable programmable read-only memories), mass storage (e.g. hard disks, CD ROMs, etc.), cache memories, and EEPROMS. Logic may also be comprised by digital and/or analog electrical hardware circuits, including the circuits of application-specific integrated circuits (ASICs), programmable gate arrays (PGAs) and field programmable gate arrays (FPGAs). Logic may be formed from combinations of software and circuits.

Figure 1:
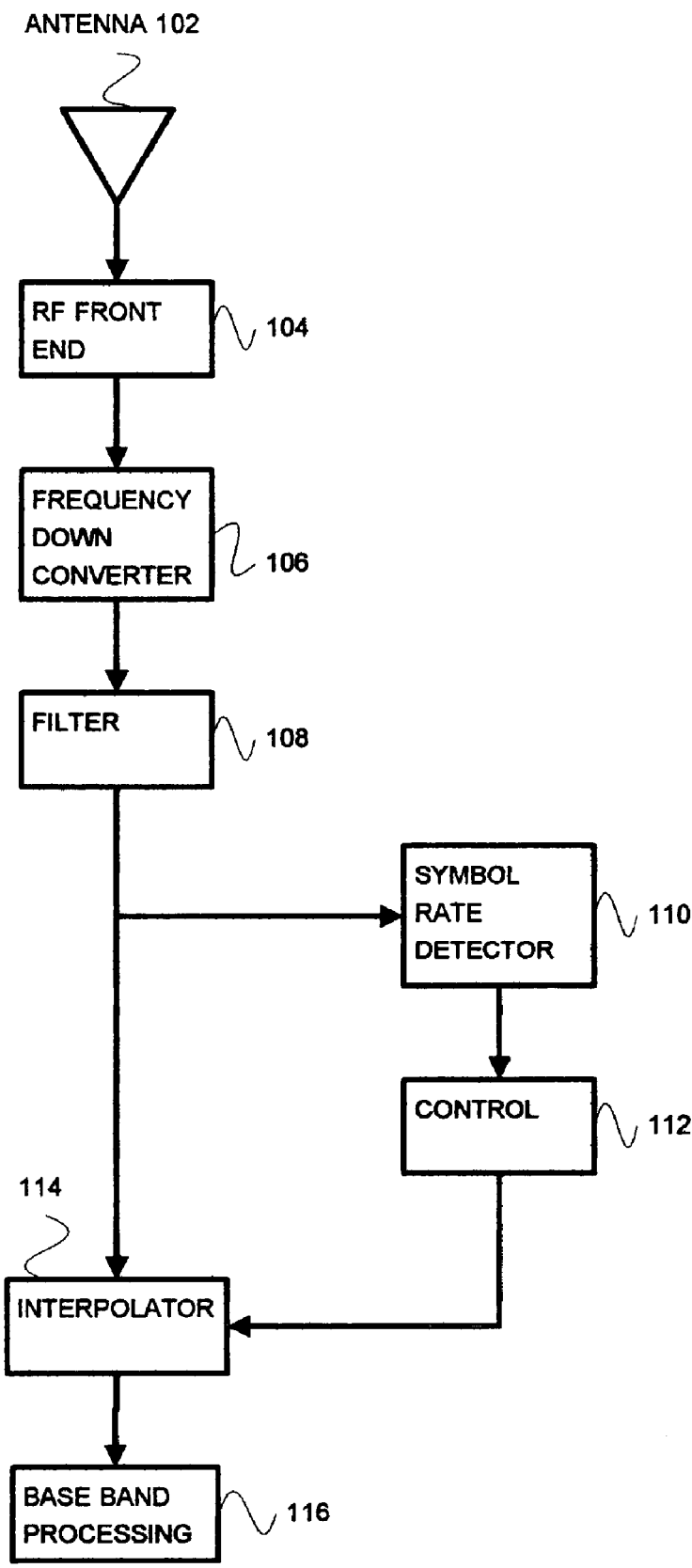
FIG. 1 is a block diagram of an embodiment of a receiver system comprising a symbol rate detector.

FIG. 1 is a block diagram of an embodiment of a receiver system comprising a symbol rate detector. In some embodiments the receiver system may comprise an antenna 102 to receive a pass band radio frequency (RF) signal. In other embodiments the receiver system may receive a pass band television signal delivered via cable or other wire-line technology. The pass band signal is typically a digitally modulated signal that includes phase-shift keying (PSK) or quadrature amplitude modulation (QAM).

Pre-processing logic is applied to the received pass band signal. Preprocessing logic may include a radio-frequency front end 104, a frequency down converter 106, and a filter 108. The pass band pre-processing logic may be employed, for example, to quantize the pass band signal, to remove noise and other undesirable signal components, and to down-convert the frequency of the pass band signal. Other embodiments may include additional or different pass band pre-processing logic than what is shown here.

The receiver system includes a symbol rate detector 110 to apply a nonlinear transformation to the preprocessed pass band signal, and to provide a frequency spectra of the preprocessed pass band signal after nonlinear processing has been applied. Examples of nonlinear processing include square-law, fourth-law, and absolute value transformations. The frequency spectra of the preprocessed pass band signal, after nonlinear processing has been applied, may include a discrete line cross-power spectral density of the preprocessed pass band signal. The receiver system may include logic 112, 114 to apply, as a base band symbol rate, a peak frequency component of the frequency spectra provided by the symbol rate detector 110.

The nonlinear transformation logic of the symbol detector 110 may include logic to produce a squared envelope of the preprocessed pass band signal, and to produce an expectation of the squared envelope. A Fourier Transformation of this expectation may comprise a peak frequency component at the symbol rate of the pass band signal.

Figure 2:
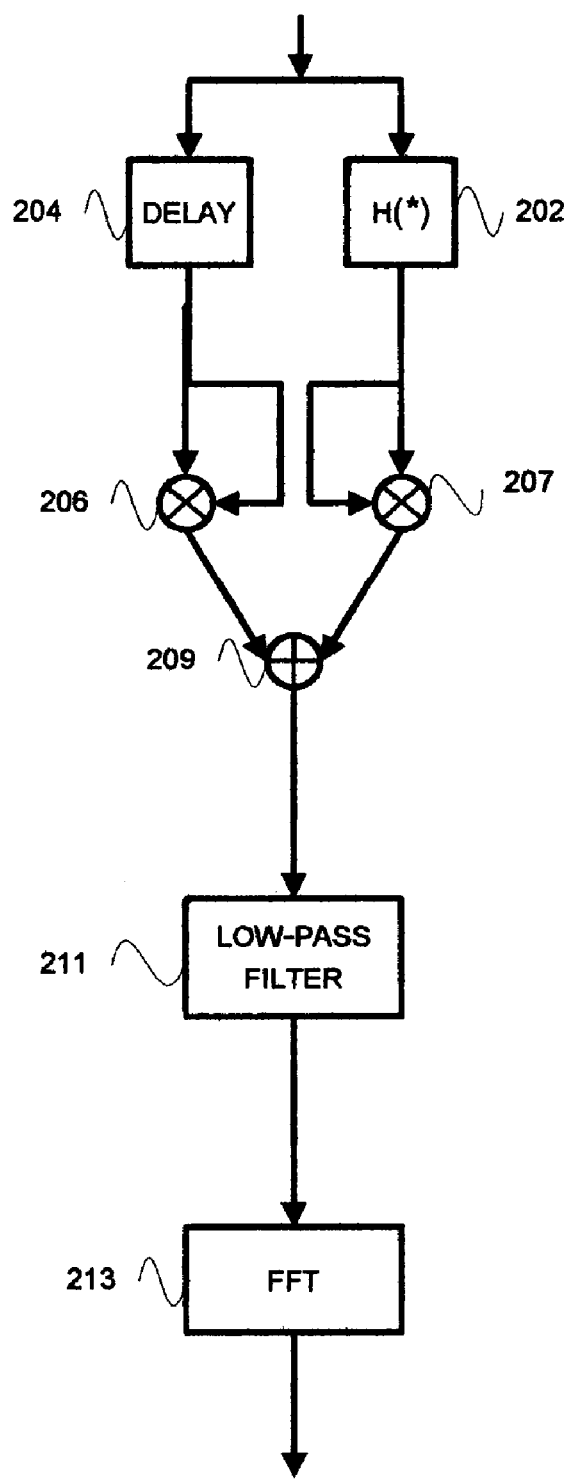
FIG. 2 is a block diagram of an embodiment of data flow for a symbol rate detector.

FIG. 2 is a block diagram of an embodiment of data flow for a symbol rate detector. A nonlinear device includes a delay 204, a Hilbert transform component 202, multipliers 206, 207 and an adder 209. The nonlinear device is coupled to receive a pass band signal. The nonlinear device may produce a sum of 1) a square of a Hilbert transform of an applied signal, and 2) a square of the applied signal phase shifted by an amount substantially the same as an amount of phase shift introduced by the Hilbert transform. The Hilbert transform component 202 may include a substantially all-pass finite impulse response (FIR) filter producing a substantially ninety degree phase shift in the pass band signal.

Some or all of the components of the nonlinear device may be implemented using logic of a field programmable gate array (FPGA), programmable gate array (PGA), or other programmable device.

A low-pass filter 211 is employed to remove frequency components of the signal provided by the nonlinear device. The filtered signal is applied to a Fourier Transform component 21, such as a fast Fourier Transform component. Logic may then be applied to the resulting frequency spectra to select a peak frequency component to apply as a symbol rate of a base band signal corresponding to the pass band signal.

An understanding of the processing involved may be gained by denoting the pass band input signal as s(t) and the Hilbert transform of s(t) as š(t). An "analytic signal" corresponding to the pass band signal may then be represented by $r(t)=s(t)+j\check{s}(t)$. The squared envelope of the pass band signal may be represented as $e(t)=r(t)\cdot r^*(t)=s^2(t)+\check{s}^2(t)$ with the symbol * meaning the complex conjugate operation. The absolute-valued envelope signal is represented by $\sqrt{e(t)}$.

A pass band signal employing PSK or QAM may be expressed by:

$$s(t) = \Re e\left[\sum_n c_n g(t-nT)e^{j2\pi f_c 1}\right] + \eta(t) \quad (1)$$

where $R_e$ denotes the real part, $f_c$ is the carrier frequency, g(t) is a base band pulse representing the symbol shaping, T is the symbol time interval and η(t) is the average white Gaussian noise function with a double-sided spectral density of $N_0/2$. The data symbols (e.g. the digital bits that modulate the pass band signal) are complex and represented by $c_n = a_n + jb_n$. These data symbols have the following statistical properties:

$\xi(a_n) = \xi(b_n) = 0$ $\xi(a_n a_m) = \beta_1 \delta_{nm}$ $\xi(b_n b_m) = \beta_2 \delta_{nm}$ $\xi(a_n b_m) = 0$ where $\delta_{nm}$ is the Kronecker delta function and ξ is the expectation operator. For simplification, the noise term η(t) in equation (1) may be disregarded, yielding:

$$s(t) = \sum_n \{g(t-nT)[a_n \cos(\cdot) - b_n \sin(\cdot)]\}$$

$$s(t) = i(t)\cos(2\pi f_c t) - q(t)\sin(2\pi f_c t)$$

The Hilbert transform is given as $\check{s}(t) = i(t)\sin(2\pi f_c t) + q(t)\cos(2\pi f_c t)$. The previous expression for the squared envelope yields $e(t) = s^2(t) + \check{s}^2(t) = i^2(t) + q^2(t)$. Thus, $$e(t) = \sum_n a_n^2 g^2(t-nT) + \sum_n b_n^2 g^2(t-nT) + \quad (2)$$

-continued
$$\sum_n \sum_{n \neq m} (a_n a_m + b_n b_m) g(t-nT)g(t-mT)$$

Applying a low pass filter to the envelope results in $$e(t) = (\beta_1 + \beta_2)\sum_n g^2(t-nT) + \quad (3)$$
$$\sum_n \sum_{n \neq m} (a_n a_m + b_n b_m) g(t-nT)g(t-mT)$$

Expression (3) describes (a) the square of the shaped pulse signal (e.g. the digital bits that modulate the carrier, shaped with a shaping filter such as a root-raised cosine filter), multiplied by a constant factor, and (b) a cross-product of the shaped pulse signal with the appropriate scaling. The Fourier Transform of the first summation term yields a power spectral density:

$$P(f) = \frac{\beta_1 + \beta_2}{T}\sum_i [G*(f)G(f)]\delta\left(f - \frac{i}{T}\right) \quad (4)$$

where G(f) is the Fourier Transform of g(t) and * denotes convolution. The second term of equation (3) represents the self-noise terms. The Fourier Transform of this second term provides a cross-power spectral density and is continuous, whereas (4) is discrete line spectra. Because g(t) is band-limited, i.e., G(f)=0 for |f|>1/T, the discrete spectral lines appear only at l=0,±1 which are the frequency components corresponding to the DC component and the pass band signal symbol rate, respectively. Consequently, the symbol rate of the input signal may be detected from the Fourier Transform of e(t) by identifying a peak frequency component within the pre-assigned frequency range that includes the symbol rate. If the pass band signal bandwidth is τ, the frequency range that may be examined for a peak frequency component is given by $\tau/2 \leq 1/T \leq \tau$.

Figure 3:
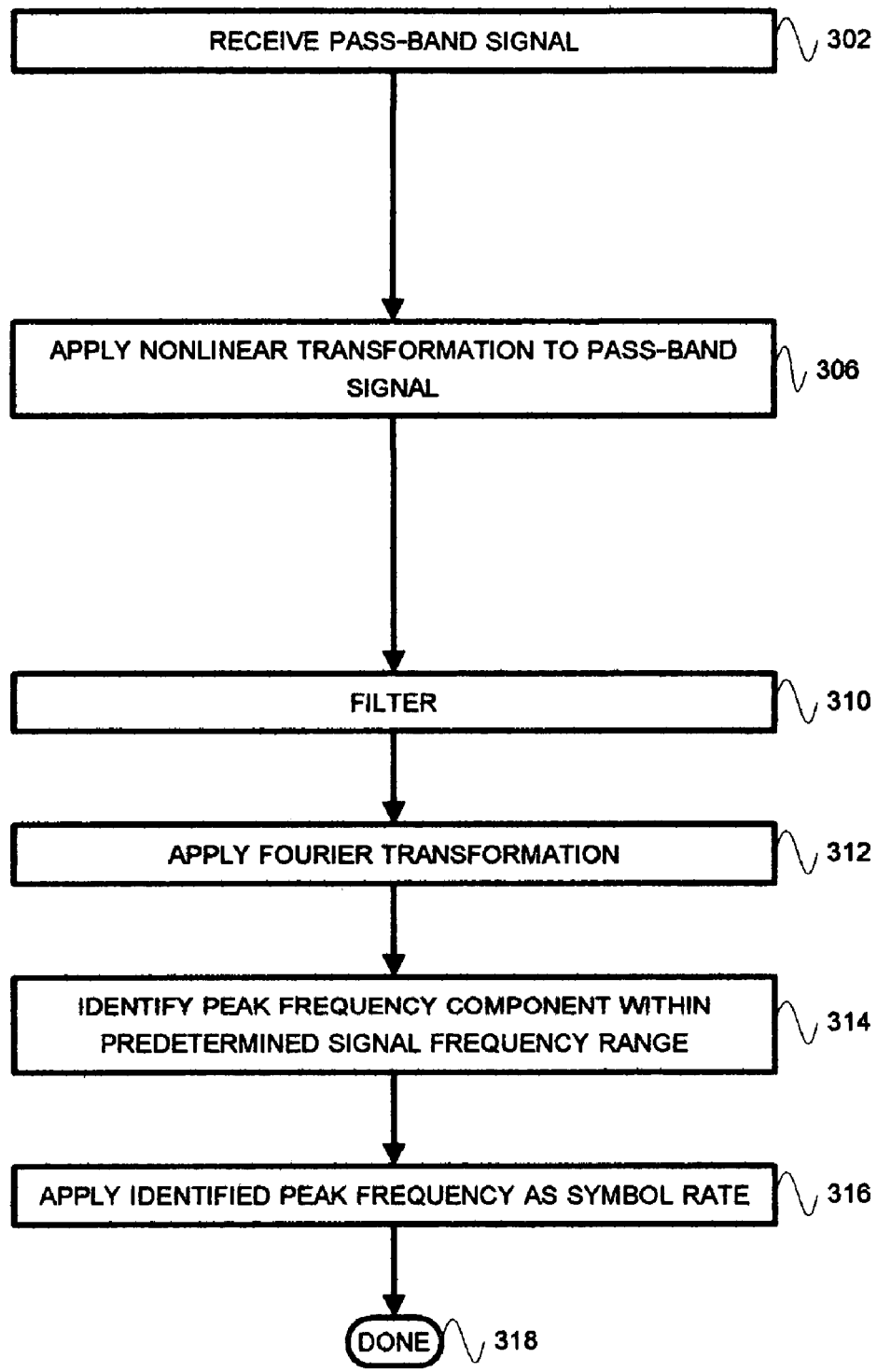
FIG. 3 is a flow chart of an embodiment of processing to determine the symbol rate of a received signal.

FIG. 3 is a flow chart of an embodiment of processing to determine the symbol rate of a received pass band signal. The pass band signal is received at 302. A nonlinear transformation is applied to the pass band signal at 306, and at 310 the results (e.g. an envelope of the pass band signal) are filtered. A Fourier Transformation (e.g. a fast Fourier Transform) is applied to the filtered results at 312. At 314 a peak frequency component of the resulting frequency spectra is identified from a pre-selected frequency range for the pass band signal. For example, the pre-selected frequency range for the pass band signal may include a range of frequencies between substantially a full pass band signal bandwidth and substantially half the pass band signal bandwidth. At 316 the peak frequency component from within the pre-selected frequency range for the pass band signal is applied as the symbol rate of a corresponding base band signal.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

What is claimed is:

1. A symbol rate detector comprising:
   a nonlinear device coupled to received a pass band signal, the nonlinear device adapted to provide a signal that includes a sum of (a) a square of a Hilbert transform of the received signal, and (b) a square of the received signal phase shifted by an amount substantially the same as an amount of phase shift introduced by the Hilbert transform;
   a component to apply a Fourier Transform to the signal provided by the nonlinear device; and
   logic to select a peak frequency component from results of applying the Fourier Transform to the nonlinear device signal and to apply the peak frequency component as a symbol rate of a base band signal corresponding to the pass band signal.

2. The symbol rate detector of claim 1, wherein the Hilbert transform comprises:
   a substantially all-pass finite impulse response filter producing a substantially ninety degree phase shift in the pass band signal.

3. The symbol rate detector of claim 1, wherein the component to apply a Fourier Transform to the nonlinear device signal comprises:
   a fast Fourier Transform.

4. The symbol rate detector of claim 1, wherein the nonlinear device comprises:
   logic of a field programmable gate array.

5. The symbol rate detector of claim 1, wherein the nonlinear device comprises:
   at least one of a square-law, fourth-law, and absolute value device.

6. The symbol rate detector of claim 1, further comprising:
   a filter to remove frequency components of the signal provided by the nonlinear device before the Fourier Transform is applied to the nonlinear device signal.

7. A method comprising:
   applying a pass band signal to a nonlinear device;
   producing with the nonlinear device a signal that includes a sum of (a) a square of a Hilbert transform of the applied signal, and (b) a square of the applied signal phase shifted by an amount substantially the same as an amount of phase shift introduced by the Hilbert transform;
   filtering the signal produced by the nonlinear device;
   applying a Fourier Transform to the filtered signal to produce a frequency spectra; and
   selecting as a symbol rate a peak frequency component of the frequency spectra from within a pre-selected frequency range for the pass band signal.

8. The method of claim 7, wherein the Hilbert transform comprises:
   a substantially all-pass finite impulse response filter producing a substantially ninety degree phase shift in the pass band signal.

9. The method of claim 7, wherein applying a Fourier Transform to the filtered signal comprises:
   applying a fast Fourier Transform.

10. The method of claim 7, wherein the nonlinear device comprises:
    logic of a field programmable gate array.

11. The method of claim 7, wherein the pre-selected frequency range for the pass band signal comprises:
    a range of frequencies between substantially a full pass band signal bandwidth and a substantially half the pass band signal bandwidth.

12. The method of claim 7, wherein the nonlinear device comprises:
    at least one of a square-law, fourth-law, and absolute value device.

13. A receiver comprising:
    a symbol rate detector to apply a nonlinear transformation to a preprocessed pass band signal and to provide a frequency spectra of the transformed preprocessed pass band signal, the transformed signal including a sum of (a) a square of a Hilbert transform of the preprocessed pass band signal, and (b) a square of the preprocessed pass band signal phase shifted by an amount substantially the same as an amount of phase shift introduced by the Hilbert transform; and
    logic to apply as a base band symbol rate a peak frequency component of the frequency spectra provided by the symbol rate detector.

14. The receiver of claim 13, wherein the frequency spectra of the transformed preprocessed pass band signal comprises:
    a discrete line cross-power spectral density of the preprocessed pass band signal.

15. The receiver of claim 13, wherein the symbol rate detector to apply a nonlinear transformation to the preprocessed pass band signal comprises:
    logic to produce a squared envelope of the preprocessed pass band signal.

16. The receiver of claim 15, wherein the logic to produce a squared envelope of the preprocessed pass band signal comprises:
    logic to produce an expectation of the squared envelope.

17. The receiver of claim 13, further comprising:
    pass band pre-processing logic.

* * * * *